Figure 4:
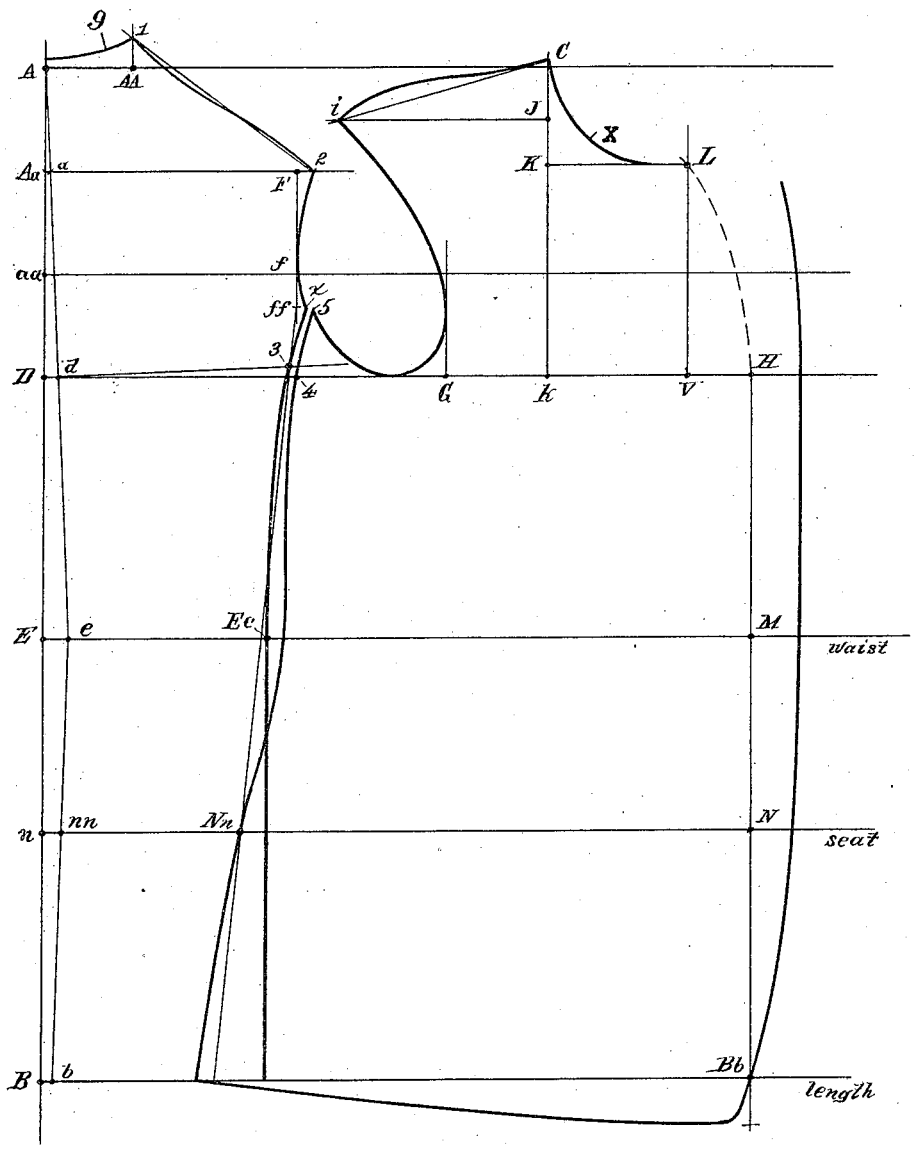

J. BAUERNFEIND.
TAILOR'S SQUARE.
APPLICATION FILED NOV. 14, 1910.
999,359.
Patented Aug. 1, 1911.
2 SHEETS—SHEET 1.
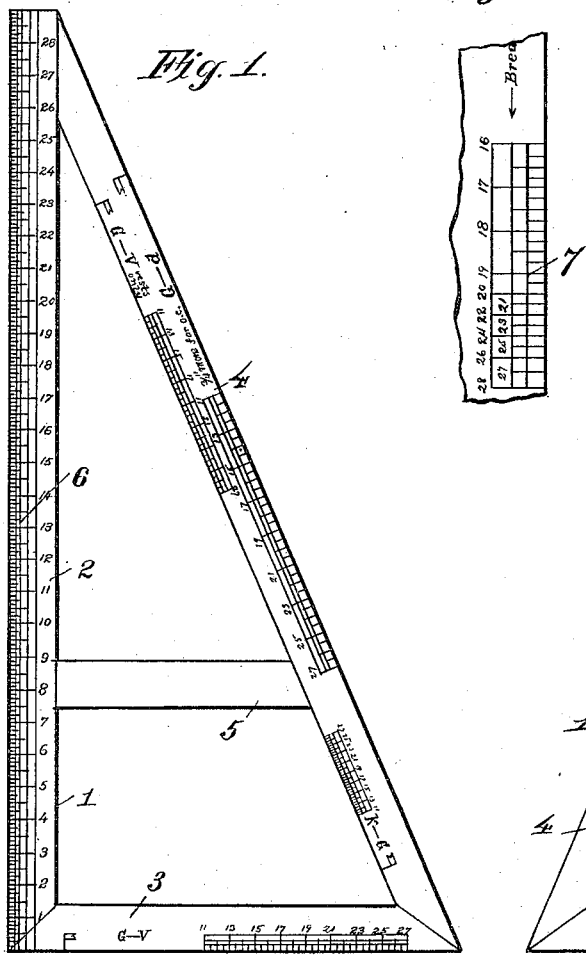
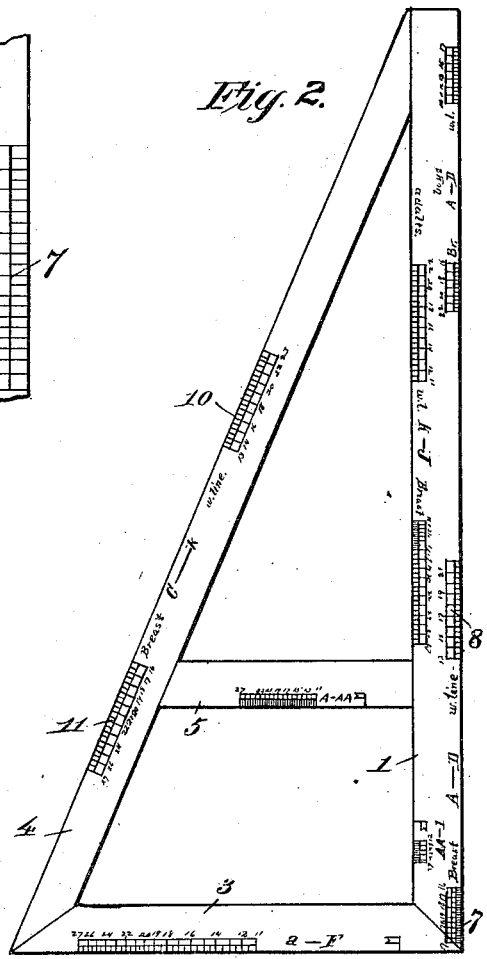
Witnesses
H. S. Austin
J. M. Wisener
Inventor
John Bauernfeind
By Joshua R. H. Potts
Attorney

J. BAUERNFEIND.
TAILOR'S SQUARE.
APPLICATION FILED NOV. 14, 1910.

999,359.

Patented Aug. 1, 1911.

2 SHEETS—SHEET 2.

Witnesses
W. S. Austin
J. M. Wisener

Inventor
John Bauernfeind
By Joshua R. H. Potts
Attorney

UNITED STATES PATENT OFFICE.

JOHN BAUERNFEIND, OF MEDFORD, WISCONSIN.

TAILOR'S SQUARE.

999,359. Specification of Letters Patent. Patented Aug. 1, 1911.

Application filed November 14, 1910. Serial No. 592,211.

*To all whom it may concern:*

Be it known that I, JOHN BAUERNFEIND, a citizen of the United States, residing at Medford, county of Taylor, and State of Wisconsin, have invented certain new and useful Improvements in Tailors' Squares, of which the following is a specification.

My invention relates to the art of tailoring and particularly to an improved tailor's square.

I have found that in laying out patterns, particularly for men's coats and vests, that certain horizontal measurements bear certain proportional relations to each other and to the chest and waist measures, and that certain vertical measurements bear a fixed relation proportional to the combined chest measure and waist length measure. All other measurements depend solely upon style.

The object of my invention is to provide an improved square by means of which patterns may be drafted from which well fitting garments may be made, after having taken the chest measure, the waste length measure and the waist girth measure.

A further object of my invention is to provide a square for the purpose mentioned provided with a plurality of scales and symbols adjacent the scales, and a chart bearing corresponding symbols to designate which scale or scales are to be used for certain measurements.

Other objects will appear hereinafter.

My invention will be more readily understood by reference to the accompanying drawing forming a part of this specification and in which—

Figure 1 is a plan view of one side of a tailor's square embodying my invention, Fig. 2 is a similar view of the reversed side, Fig. 3 is a detail view of one of the scales, and Fig. 4 is a plan view of the chart.

Referring now to the drawings 1 indicates the square comprising the legs 2 and 3 at right angles to each other, the hypotenuse 4 and an intermediate cross member 5. The longer leg 2 is provided upon one face with a scale dividing the same into inches and fractions of inches, such as eighths, and if preferred sixteenths. The reversed side of the leg 2 and both sides of the other leg and of the hypotenuse are provided with sundry scales the use of which will be explained hereinafter.

X indicates the chart laid out with a plurality of vertical, horizontal and diagonal lines bearing certain relations to each other to be obtained from the scales on the square and provided with numerous symbols indicative of points on the lines and corresponding to similar symbols on the several scales of the square whereby the proper scale may be readily ascertained for locating the various lines and points on the pattern as it is laid out.

The method of drafting a pattern by use of the square will now be described, as a better understanding of the square and the several scales thereon may be obtained in this manner. First, the breast measure, the waist measure and the waist length measure of the person for whom the garment is being made is taken. It will be assumed that these measurements are normal or for an average man in which case the breast measure will be 38 inches, the waist 34 inches and the waist length 17½ inches. Other measurements such as for the entire length of the garment, etc. may be taken, but as these relate only to the style they will not be considered or described fully in this specification.

The method of laying out the pattern will be best understood by referring to Fig. 4. A vertical line A—B is drawn and from A a horizontal or perpendicular line is drawn. From A, on the line A—B, a point E is marked the distance of the waist length and from the point E a horizontal or perpendicular line is drawn. This is the waist line. The distance from A to B is the full length of the garment and varies with the style. The line A—B represents the center of the back, and to obtain the proper curve for the back of the garment the center back seam is determined by marking a point on the waist line ¾ of an inch to the right of the point E and another ⅜ of an inch to the right of the point B and connecting the point A with the point *e* on the waist line, and the last said point with the point *b*.

As in laying out a pattern, only one half of the back and one half of the front is drafted, the measurements are taken in terms of one half of the breast measure and one half of the waist measure while the full length of the waist length measure is used. In this instance one half of the breast measure is 19 inches and one half of the waist measure is 17 inches.

Points are now to be ascertained for locating the arm hole curve and side seam on the back, and these are ascertained by the use of the square. The scale on the square marked "Breast—A—D—waist length" is used and the point 19 on the breast end 7 is placed on the point A and the point D is marked on the line A—B at the scale division 17½ on the waist length end 8. The distance from A to D is then divided into three equal parts and horizontal or perpendicular lines are drawn from the points A*a*, *aa* and D. Where the perpendicular from D intersects the line A—*e* a point *d* is marked. From the point *d* a perpendicular line is drawn from the line A—*e* and upon this is located a point 3 which is on the side seam curve to be presently located. One third of the waist length below the point E is located a point *n* and from this point a horizontal or perpendicular line is drawn.

The various points on the horizontal lines are now to be located. The point AA is located by means of the scale marked "A—AA" on the portion 5 of the square, the zero point of the scale being placed on the point A and the point AA marked at the graduation 19 (half the breast measure) of the scale. The point 1 is then determined by the scale marked "AA—1" by placing the zero mark of the scale on the point A and marking a point at 19 on the scale on a line extended vertically from the point AA. The scale "*a*—F" is now placed on the line extending from the point A*a* with the zero at *a* and the point F is marked at 19 on the scale. From the point F a perpendicular is dropped downwardly intersecting the line from *aa* and the intersection of these lines determines the point *f*. One inch below the point *f* is placed a point *ff* and one fourth of an inch to the right of point *ff* is located a point *x*. One half of an inch to the right of point F is located a point 2. The points 2, *f* and *x* are used to determine the curve of the arm hole on the back. To get the proper width of the back to the side seam, a point E*e* is located on the line extending from E at a distance from the point *e* equal to the line *a*—F less one and one half inches. From the point thus ascertained a perpendicular is dropped to the line B and a curved line is extended upwardly to the point *x*, the point 3 being at intersection of this curved line with the diagonal line extending from *d*. The points 1 and 2 are connected by a straight line and then slightly curved as shown to give the shoulder seam. The neck curve line 9 is then drawn from the point 1 to the main line at a distance above A equal to the seam allowance. This completes the drafting of the back.

In drafting the front the point H is first to be ascertained. This is laid off on the horizontal line from D a distance equal to one half the breast length plus two and one half inches, the additional being made for the seams and comfort. A perpendicular line is then dropped from the point H and the points M, N and B*b* located at the intersection of this line with the lines drawn from the points E, *n* and B. One half of the girth at the line *n* (19 inches) plus three inches is measured off to the left of the point N, and a point N*n* marked for the side seam of the front at a distance from the point N equal to the above measurement (22 inches) less the distance from *e* to E*e*. A straight line is drawn through the points *ff* and N*n* and the side seam is laid off with relation to this line according to the style desired, in this instance a little is subtracted from the width at the waist line and little added at the bottom line. To the right of the vertical line from H an allowance of one and one half inches is made for lap.

The line D—H is scye body line, and the correct points for laying out the pattern above this line are now to be ascertained. To obtain the correct location of the front of scye, the point G is located on the line D—H by means of the scale G—*d* on the square, the zero mark of the scale being placed at *d* and the point G marked at 19. From G a vertical line is drawn which locates the most forward portion of the arm hole curve. The scale G—*k* is then placed with the zero at G and the point *k* marked at 19 on the scale. From the point *k* a perpendicular is drawn upwardly beyond the line extending through A—AA. The scale C—*k* is then placed on the line extending upwardly from *k* with a division 17½ of the waist length portion 10 on the point *k* and the division 19 on the breast portion 11 determines the point C. From C downwardly is marked a point K equal to the distance from A to A*a*. The scale *k*—J is then placed with the waist length division 17½ at *k* and a point J marked at the breast division 19. From point J a perpendicular is drawn to the left and a point *i* is located in said line at a distance from the point C equal to the distance between the points 1 and 2 less ¼ of an inch. One fourth of an inch to the right of *ff* is located a point 5, and the arm hole curve is drawn from the point *i* to the point 5 tangent to the scye body line and the vertical line from G. A curved line is then drawn from C to *i* for the shoulder seam. The scale G—V is then placed with the zero at G and the point V is marked at 19. A perpendicular is extended upwardly from V and a horizontal from the point K and the intersection of these lines determines the point L at the front of the neck curve. At the intersection of the scye body line and the side seam is marked a point 4 which must fall upon the point 3 when the parts are put together.

The remaining lines of the pattern may then be drawn from point to point.

It will be noted that the scales a—F, A—D and k—J have reductions in the sizes of the divisions beyond certain points to prevent the garment becoming misshapened when the various measures taken are abnormal.

Having described my invention what I claim as new and desire to secure by Letters Patent is:

1. A tailor's square having a plurality of scales thereon arranged in pairs, one scale of each pair being graduated in terms of the breast measure and the other graduated in terms of the waist length, the scales of each pair being used together to ascertain various measurements in length in the laying out of patterns, substantially as described.

2. A square having a plurality of scales thereon graduated in terms of the breast measure, waist measure and waist length measure and said scales varying in size of graduations, but having the same figures of designation of the said measures, and symbols adjacent said scales corresponding to certain measurements to indicate which scale or scales are to be used to ascertain the various lines and points necessary in laying out a pattern, substantially as described.

In testimony whereof I have signed my name to this specification in the presence of two subscribing witnesses.

JOHN BAUERNFEIND.

Witnesses:
VINCENT A. HIRSCH,
HERMAN A. MAURER.

---

Copies of this patent may be obtained for five cents each, by addressing the "Commissioner of Patents, Washington, D. C."